Patented Mar. 23, 1954

2,673,192

UNITED STATES PATENT OFFICE 2,673,192

CHLORATE-SULFITE REDOX-INITIATED AQUEOUS POLYMERIZATION OF VINYL DERIVATIVES

Archie Hill, Painesville, Ohio, assignor to Diamond Alkali Company, Cleveland, Ohio, a corporation of Delaware No Drawing. Application November 10, 1950, Serial No. 195,133

18 Claims. (Cl. 260—88.7)

This invention relates to a method for polymerizing monomers and comonomer mixtures of vinyl derivatives, and more particularly relates to a new and improved process in redox-initiated polymerizations of vinyl derivatives.

It has heretofore been proposed to polymerize various olefinic compounds of the vinyl type, where such compounds are emulsified or otherwise dispersed in an aqueous medium including a redox system for initiating the polymerization reaction employing peroxidic oxidizing agents with various reducing agents as the polymerization initiators. The peroxides, both organic and inorganic, are not especially desirable as components of redox-initiated polymerization systems because of their relatively unstable chemical character, which renders their manufacture difficult and their storage life uncertain.

The use of inorganic oxidizing agents having a non-peroxidic molecular structure in redox-initiated polymerization systems for the polymerization of vinyl compounds has also been proposed broadly. More specifically, it has been proposed to employ sulfites and chlorates as polymerization initiators of the redox type, but experiments following this prior art teaching have shown it to be wholly inadequate, and inaccurate in specific instances, in providing fundamental principles upon which to base a feasible process, either commercial or otherwise.

The inadequacy of this prior art teaching has apparently been that the redox systems proposed have failed to initiate and sustain the polymerization reaction, even where the reducing agent is added to the polymerization reaction medium gradually over a period of hours.

It has now been found that chlorate ions in an aqueous solution may be caused to react with sulfite and bisulfite ions in such solution and in contact with certain vinyl derivatives noted hereinbelow so as to produce sufficient free radicals to initiate and sustain the polymerization reaction to an extent that a high yield of polymer or copolymer is obtained within a relatively brief reaction period if certain factors are coincident. The most important of these factors are providing at least an equivalent molecular proportion of the sulfite or bisulfite ion to the chlorate ion in the polymerization medium and maintaining the hydrogen ion concentration of the aqueous phase within the range of 2–6.5 during the polymerization reaction period.

Without intending to be limited by theoretical considerations as to the natural laws underlying the invention, the observations and discussion given below are offered in regard thereto as principles upon which to base a feasible process. On the acid side of the pH range a sulfite salt probably dissociates so as to give both sulfite and bisulfite ions in solution, and hence, for the purposes of this discussion, the terms are used interchangeably hereinafter; it is to be understood that the disclosure of sulfite salts likewise includes the corresponding bisulfite salts.

The necessity for at least an equivalent molecular proportion of sulfite ion and chlorate ion appears from experimental evidence to arise from the circumstance that while oxidation of the sulfite ion by the chlorate ion to sulfate ion may be written as a simple one-step reaction producing sulfate and chloride, the reaction probably proceeds stepwise in acid solutions to produce sulfite or bisulfite free radicals, which are the polymerization initiators. Thus, if equivalent molecular proportions of chlorate ion and sulfite ion are used (molar ratio of chlorate ion to sulfite ion of 1:3), the polymerization reaction may proceed at such a rate that 85%, and in some instances more than 90%, conversion is obtained within a period of 1–3 hours from the time the redox system and polymerizable material are initially brought into contact. If the equivalent molecular proportions of chlorate ion and sulfite ion are increased in the sulfite component to twice this value (molar ratio of chlorate ion to sulfite ion, 1:6), the yield of polymer may be increased in specific instances to more than 90% in the same interval. Where the proportion of sulfite ion in the ratio of chlorate to sulfite exceeds twice the equivalent molecular proportion, i. e., where the molar proportion of chlorate to sulfite exceeds 1:6, no appreciable increase in rate of polymerization has been observed.

The present invention embodies a new and useful method in the art of redox-initiated polymerizations of monomers and comonomers of monoethylenically-unsaturated, polymerizable, organic compounds having a terminal ethylenic double bond. Desirable members of this class of compounds may be described as having the generic formula H₂C=CXY, wherein X represents a member of the group of hydrogen, methyl, and chlorine, and Y represents a member of the group of chlorine, cyanide, RCOO—, and —COOR′, wherein R represents a saturated hydrocarbon radical having from 1-3 carbon atoms, and R′ represents a saturated hydrocarbon radical having from 1-4 carbon atoms. When the above-noted factors are combined in non-peroxidic redox systems for initiating such polymerization, the aforementioned high yields of polymers and copolymers having molecular weights comparable to those obtainable by the prior art methods employing peroxidic catalysts are obtained.

The present invention contemplates the polymerization of vinyl derivatives of the class including vinyl chloride, vinyl cyanide, vinyl esters, such as the acetate, propionate, and butyrate, acrylic esters, such as methyl-, ethyl-, propyl-, and butyl acrylates, as well as the corresponding methacrylate esters, 2-chloro-propene-1, methacrylonitrile, 2-cyano-propene-1, isopropenyl acetate, propionate, and butyrate, vinylidene chloride (asym. dichloroethylene), 1-chloro-1-cyanoethylene, 1-chloro-ethenyl acetate, propionate, and butyrate, and the methyl-, ethyl-, propyl-, and butyl esters of alpha-chloroacrylic acid. The invention especially contemplates the polymerization of the monomers and comonomers of the group of vinyl chloride, vinylidene chloride, the vinyl esters, vinyl cyanide, the acrylates, and methacrylates, in binary, ternary, and quaternary mixtures.

More specifically, the present invention contemplates the steps of dispersing monomers and comonomer mixtures of the group noted above in an aqueous acidic medium containing a mixture of water, a source of sulfite ions, and a source of chlorate ions, said source of sulfite ions being in excess of the equivalent molecular proportion of said source of chlorate ions, maintaining the pH of said medium substantially within the range of 2-6.5 during the polymerization reaction, and recovering a polymerizate from said medium.

Of the monomeric olefinic compounds noted above to be within the scope of the present invention, vinylidene chloride, and higher molecular weight chloro- and cyano-derivatives, as well as the ester derivatives, may be polymerized in systems operating at atmospheric or slightly above atmospheric pressure, while the polymerization of vinyl chloride in accordance herewith is preferably carried out at pressures substantially above atmospheric pressure, i. e., at the autogenous pressure of the system, because of its low boiling point (−12° C.). Also, polymerization of comonomer mixtures containing two or more of the above, in which vinyl chloride is one of the components of the mixture, is also preferably carried out at superatmospheric pressure in order to insure substantially complete liquidity of the monomeric vinyl chloride.

In carrying the method of the present invention into effect, the desired amount of water is initially combined with a suitable source of either chlorate or sulfite ions, such as chloric or sulfurous acids, or a water-soluble ammonium, alkali metal, alkaline earth metal, or heavy metal chlorate or sulfite. The chlorate and sulfite salts preferred for the purposes of the present invention include sodium, potassium, and ammonium chlorates, sulfites, and bisulfites. The amount of water and chlorate or sulfite ions to be provided is dependent to some extent upon the amount of monomer or comonomer to be polymerized, as discussed more fully hereinafter.

A suitable emulsifier or dispersing agent substantially inert to the chlorate and sulfite ions may also be employed in the aqueous phase in concentrations within the range of 0.5%–2% of the weight of the monomer, depending upon the emulsifying agent or dispersing agent used and its efficiency in producing the desired degree of emulsification or dispersion in acid media. Emulsifiers which have been found suitable in this connection include the anion active wetting agents, such as the alkyl sulfates, alkyl sulfonates, alkyl aryl sulfonates, the cation active wetting agents, such as the quaternary ammonium compounds, and the like, as well as the non-ionic emulsifying agents, such as the polyhydroxy compounds, for example, polyvinyl alcohol, ethylene oxide polymers, hydroxy esters and ethers, such as the polyglycols, and the like. However, the alkyl sulfates having from 12 to 14 carbon atoms in the alkyl chain are preferred for the reason that such alkyl sulfate emulsifiers are readily available commercially in a relatively high state of purity. The purity of the emulsifier is of significance in any emulsion polymerization system since it has long been known that where such emulsifier contains substantial amounts of olefinic alkyl chains, particularly the conjugated olefinic alkyl chains, or where the alkyl chain bears tertiary hydrogen, either of which may be present in certain of the alkyl aryl sulfonates, such compounds are responsible for terminating the polymerization of the above-noted olefinic monomers relatively early in the polymerization reaction period, whereby a low yield of polymerizate results.

After combining the water with a source of chlorate or sulfite ions, and emulsifier, if desired, in a suitable container, the monomer or comonomer mixture of the above-noted olefinic compounds is dispersed in the aqueous phase and the remaining member of the redox system, i. e., the source of chlorate or sulfite ions, as the case may be, is added to the polymerization reaction medium and the reaction mass thus formed brought to the desired polymerization temperature. Where vinyl chloride is employed as a monomer or as a member of a comonomer mixture, the combination of water, emulsifier, and the source of either chlorate or sulfite ions may conveniently be cooled to a temperature below the desired polymerization reaction temperature and the vinyl chloride monomer or comonomer mixture dispersed in the aqueous medium under pressure sufficient to maintain the liquidity of the vinyl chloride; the other member of the redox system may be added to the aqueous dispersion of the vinyl chloride monomer or comonomer mixture either before or after the polymerization reaction system is brought to the polymerization reaction temperature. Vinylidene chloride, vinyl acetate, and vinyl cyanide, and the other higher molecular weight monomers noted above, may be polymerized as monomers or as comonomer mixtures in accordance with the present invention by carrying out the above-described series of steps to obtain a dispersion of a monomer or comonomer mixture in the aqueous phase, then adding the remaining member of the redox system, bringing the reaction mass to the desired temperature, and carrying out the polymerization reaction at such temperature.

The above techniques are preferred for the reason that in acid media, the rate of the reaction of chlorate ion with the sulfite ion out of contact with the monomer or comonomer mixture is rapid, probably proceeding through a free radical mechanism as noted hereinabove, and it is therefore highly desirable to have the monomer or comonomer mixture dispersed in the aqueous phase containing one of the members of the redox system prior to adding the other member to the polymerization reaction medium in order that the monomer or comonomer mixture may effectively compete with the various intermediate products of an oxidation-reduction reaction of chlorate with sulfite for the free radicals formed in a stepwise oxidation of sulfite, whereby both an oxidation-reduction reaction and a polymerization reaction are sustained over a prolonged period of time and a relatively high yield of polymerizate is obtained.

With the molar ratios of the oxidizing agent to the reducing agent established as hereinabove described, the ratio of the sum of the mols of chlorate ion and sulfite ion to the mols of monomer or comonomer may suitably be within the range of approximately 0.1–2.0 mol percent of the molar amount of monomer or comonomer mixture used. Preferably, however, the sum of the molar proportions of oxidizing agent and reducing agent amounts to about 0.4–1.5 mol percent of the molar amount of monomer or comonomer mixture employed.

The weight ratio of the amount of monomer or comonomer mixture to the total of ingredients contained in the aqueous phase may suitably be of the order of approximately 1 part by weight of the monomer or comonomer mixture to 1–4 parts by weight of the aqueous phase, it having been found that 1 part of monomer or comonomer mixture to approximately 3 parts of the aqueous phase is especially suitable either to batch or continuous operations.

The pH of the aqueous medium may be adjusted to the desired point within the above-noted range at any step prior to adding the second substance of the redox system thereto. In general, it has been found that the pH of the aqueous medium decreases as polymerization proceeds. In the lower values of the pH range, the pH of the aqueous medium is preferably controlled during polymerization by means of buffer salts added to the aqueous phase in an amount sufficient to maintain the reaction medium within the desired pH range. Buffers which have been found suitable for the purposes herein include mixtures of acetic acid and sodium acetate, as well as the universal buffer of Britton & Robinson ("Hydrogen Ions"—Britton, 2nd Ed., page 225) consisting of acetic acid-phosphoric acid-boric acid-NaOH, and the like.

The temperature at which the polymerization is carried out is preferably within the range of 25°–80° C., depending upon the monomer or comonomer mixture employed. Thus, for example, in the polymerization of vinyl chloride monomer, the temperature of the polymerization reaction mixture may be maintained substantially within the range of 25°–50° C., preferably, however, within the range of 35°–45° C., it having been found that temperatures substantially above this latter range increase the rate at which the vinyl chloride is polymerized but decrease the average molecular weight of the polymer produced, and that temperatures substantially below 25° C. increase the average molecular weight of the polymer molecule beyond the technically useful range for milling and extruding purposes and extend the reaction time of the polymerization beyond that desirable either in a continuous method or in a batch method for a high production rate of the polymer. Vinyl esters, such as vinyl acetate, having much higher boiling points than vinyl chloride and being more reluctant polymerizers, may be subjected to temperatures of the order of the reflux temperature of the mixture of monomer and aqueous medium (about 70°–80° C.) during the polymerization reaction without detriment to the polymer obtained.

In order that those skilled in the art may better understand the method of the present invention and in what manner the same may be carried into effect, the following specific examples are offered:

The molecular weight values referred to herein are calculated from the viscosity of a solution of one gram of polymerizate in 100 mls. of solvent (cyclohexanone), as determined by means of a modified "Ostwald" viscosimeter tube immersed in a constant temperature bath.

For the purpose of comparing the effects of various polymerization reaction conditions imposed by the method of the present invention, the tabulations of data given in Examples I–III below are for systems in which vinyl chloride is used as the monomer, the polymerization reaction mass is maintained at 40° C. by means of a constant temperature bath surrounding the reactor, the weight ratio of monomer to aqueous phase is 1:3, and the amount of emulsifier (commercial lauryl sulfate, purified to remove $Na_2SO_4$ and polymerization inhibitors) is 1% of the weight of monomer.

The aqueous medium (300 parts) is prepared by combining water, emulsifier, and sulfite salt and refrigerating this mixture at −25° C.; to the resultant frozen mass there are added 100 parts of monomer and the chlorate salt. The reaction vessel is then closed to the atmosphere, the temperature brought to 40° C., and the polymerization carried out at the autogenous pressure of the system. The percent conversion is the value obtained at the time indicated in the table, measured from the time that the system is closed, and does not in all instances represent the maximum obtainable within the pH range of 2–7. Generally, the percent conversion is found to be substantially a straight line function tending to level off above about 85%.

*Example I*

In the following experiments, the results of which are tabulated below, potassium chlorate (0.15 part) and sodium sulfite (0.93 part) are the source of polymerization initiators; the molar ratio of chlorate ion to sulfite ion is 1:6, and the sum of the mols of chlorate and sulfite is 0.54 mol percent of the monomer used:

| pH Initial | pH Final | Time (Hrs.) | Percent Conversion | Molecular Weight |
|---|---|---|---|---|
| 2.0 | 1.78 | 0.67 | 54 | 78,500 |
|  | 1.80 | 1.1 | 72 |  |
| 3.0 | 2.35 | 0.67 | 50 | 78,500 |
|  | 2.48 | 1.1 | 83 |  |
| 4.0 | 2.55 | 0.67 | 50 | 77,600 |
|  | 2.60 | 1.1 | 84 |  |
| 5.0 | 2.65 | 0.67 | 53 | 79,400 |
|  | 2.60 | 1.1 | 80 |  |
| 6.0 | 5.75 | 1.1 | 14 | 108,600 |
|  | 5.75 | 3.25 | 54 |  |
| 6.5 |  | 2 | 44 | ---------- |
| 7.0 | 7.1 | 23.3 | 35 | 110,000 |

Example II

In the following experiments, the pH of the aqueous medium is initially adjusted to 5, the molar ratio of chlorate to sulfite is 1:6; the other factors are varied as indicated:

| Parts | | $ClO_3^- + SO_3^{--}$ Mol percent of Monomer | pH, Final | Time (Hrs.) | Percent Conversion | Molecular Weight |
|---|---|---|---|---|---|---|
| KClO$_3$ | Na$_2$SO$_3$ | | | | | |
| 0.30 | 1.87 | 1.07 | 2.78 | 0.67 | 59 | 62,300 |
| | | | 2.75 | 0.9 | 75 | |
| | | | 2.78 | 1.2 | 92 | |
| 0.15 | 0.935 | 0.54 | 2.85 | 0.67 | 56 | 74,700 |
| | | | 2.82 | 0.9 | 69 | |
| | | | 2.85 | 1.2 | 90 | |
| 0.075 | 0.465 | 0.26 | 3.12 | 0.67 | 36 | 80,300 |
| | | | 3.12 | 0.9 | 68 | |
| | | | 3.05 | 1.2 | 78 | |
| 0.038 | 0.232 | 0.13 | 3.65 | 0.67 | 20 | 97,700 |
| | | | 3.38 | 1 | 35 | |
| | | | 3.32 | 1.5 | 68 | |
| | | | 3.35 | 2 | 89 | |

Example III

In the following experiments, the pH of the aqueous medium is initially adjusted to 5; the other factors are varied as indicated:

| Parts | | Molar Ratio, $ClO_3^-/SO_3^{--}$ | $ClO_3^- + SO_3^{--}$ Mol Percent of Monomer | pH, Final | Time (Hrs.) | Percent Conversion | Molecular Weight |
|---|---|---|---|---|---|---|---|
| KClO$_3$ | Na$_2$SO$_3$ | | | | | | |
| 0.15 | 0.935 | 1:6 | 0.54 | 2.60 | 0.4 | 35 | 75,000 |
| | | | | 2.80 | 0.67 | 58 | |
| | | | | 2.80 | 1 | 90 | |
| 0.30 | 1.39 | 1:4.5 | 0.84 | 2.70 | 0.4 | 33 | 65,300 |
| | | | | 2.60 | 0.67 | 54 | |
| | | | | 2.60 | 1 | 89 | |
| 0.15 | 0.465 | 1:3 | 0.31 | 2.82 | 0.4 | 28 | 81,800 |
| | | | | 2.82 | 0.67 | 54 | |
| | | | | 2.80 | 1 | 88 | |
| 0.15 | 0.232 | 1:1.5 | 0.19 | 3.20 | 0.4 | 21 | 92,800 |
| | | | | 3.10 | 0.67 | 40 | |
| | | | | 3.00 | 1 | 74 | |
| | | | | 3.00 | 1.2 | 86 | |

Example IV

In 300 parts of water containing 1 part of lauryl sulfate purified to remove Na$_2$SO$_4$ and polymerization inhibitors, 0.466 part of Na$_2$SO$_3$ is dissolved; the pH of the solution is adjusted to 5 and the mixture frozen at $-25°$ C. in a suitable vessel. To the frozen mass in the vessel there are added 54 parts of vinyl chloride, 46 parts of vinyl cyanide, and 0.15 part of KClO$_3$ dissolved in 10 parts of water. The vessel is closed to the atmosphere and the contents heated to 40° C., and agitated. Autogenous pressure of the system is maintained during the polymerization reaction. The conversion is 45% in 1.5 hours, from the time the KClO$_3$ is added to the system, and 80% in 3 hours from the same time.

Example V

One hundred parts of a mixture containing 90 mol percent of vinyl chloride and 10 mol percent of vinylidene chloride are subjected to polymerization at 40° C., employing the same procedure and amounts of ingredients as in Example IV, including water, lauryl sulfate, Na$_2$SO$_3$, and KClO$_3$, with the pH initially at 5. Autogenous pressure is maintained during the polymerization reaction. The conversion is 78% within 2.17 hours and 94% within 4.34 hours, from the time the chlorate is added to the system.

An equimolar mixture of potassium persulfate and sodium sulfite, amounting to 0.5 mol percent of the comonomer mixture, gives a yield of 96% copolymer in an interval of about 30 hours under the same reaction conditions which are optimum for this redox system.

Example VI

One hundred parts of monomeric vinyl cyanide are subjected to polymerization at 40° C., employing the same procedure and amounts of ingredients as in Example IV, including water, lauryl sulfate, Na$_2$SO$_3$, and KClO$_3$, with the pH of this solution initially at 5. Autogenous pressure is maintained during the polymerization. The conversion is 21% within 1.59 hours, 60% within 2.5 hours, and 90% within 3 hours, from the time the chlorate is added to the system.

Example VII

Employing the same procedure and amounts of ingredients as in Example IV, including water, KClO$_3$, and Na$_2$SO$_3$, with the pH of this solution initially at 5, 100 parts of monomeric vinyl chloride are subjected to "pearl" polymerization, that is, the emulsifier is omitted from the polymerization reaction mass, whereby vinyl chloride monomer is dispersed in the aqueous phase by means of mechanical agitation alone without the benefit of the action of an emulsifying agent. The conversion is 58% in 55 minutes, and 82% in 1.34 hours.

Example VIII

One hundred parts of monomeric vinylidene chloride are subjected to polymerization at 40° C., employing the same procedure and amounts of ingredients in the aqueous phase as are employed in Example IV. Autogenous pressure is maintained during the polymerization reaction. The yield of polymer is 49% in 4 hours.

Under the same polymerization conditions, employing potassium persulfate in place of the redox system in the proportion of 0.38 mol percent of the monomer, the yield of vinylidene polymer is 50% in 6.25 hours.

Example IX

Two hundred fifty parts of vinyl acetate (2.9 mols) are dispersed in 240 parts of a 5% aqueous solution of vinyl alcohol containing 1.05 parts of $Na_2SO_3$ (0.0083 mol). This mixture is heated to the reflux temperature (about 68° C.) and 0.319 part of $NaClO_3$ (0.003 mol) in the form of a 10% aqueous solution is added to the refluxing mixture over a period of 15 minutes. The percent conversion to vinyl acetate polymer is 64% in 1 hour, and 90% in 1.75 hours.

Example X

A comonomer mixture consisting of 7 parts of vinyl acetate, 26 parts of vinyl cyanide, and 67 parts of vinyl chloride, under sufficient pressure to maintain the vinyl chloride in the liquid state at the ambient temperature, is combined with a mixture of 300 parts of water, 1 part of commercial lauryl sulfate purified to remove sodium sulfate and polymerization inhibitors, and 0.466 part of $Na_2SO_3$ (0.0037 mol.) To this combination of ingredients there is added 0.15 part of $KClO_3$ (0.0012 mol), and the whole mass heated to 40° C., with agitation, and under autogenous pressure in a closed system. A conversion of 33% of copolymer is obtained in 7 hours from the time the $KClO_3$ is added to the system.

Using the same proportions of the comonomer mixture, water, lauryl sulfate, and $Na_2SO_3$, and adding 1 part of $K_2S_2O_8$ (0.0037 mol) in place of the $KClO_3$, gives a yield of 36% of the copolymer in the same period of time.

Example XI

A comonomer mixture consisting of 15 parts of ethyl acrylate and 85 parts of vinyl chloride, under sufficient pressure to maintain the vinyl chloride in the liquid state at the ambient temperature, is dispersed in a mixture of 300 parts of water, 1 part of commercial lauryl sulfate purified to remove sodium sulfate and polymerization inhibitors, and 0.466 part (0.0037 mol) of $Na_2SO_3$. To these ingredients there is added 0.15 part $KClO_3$ (0.0012 mol), and the whole mass heated to 40° C., with agitation, and under autogenous pressure in a closed system. A conversion rate of 98% of copolymer is obtained in 2.5 hours from the time the $KClO_3$ is added to the system.

Using the same proportions of the comonomer mixture, water, lauryl sulfate, and adding 1 part of $K_2S_2O_8$ (0.0037 mol) in place of the redox system, gives a conversion rate of 77% of copolymer after a period of 6.25 hours from the time the persulfate is added to the system.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of polymerizing monoethylenically-unsaturated, polymerizable, organic compounds of the class having a terminal ethylenic double bond, which includes the steps of dispersing 1 part by weight of a material of said class in not more than 4 parts by weight of an aqueous acidic medium including a mixture of water, sulfite ions, and chlorate ions, said sulfite ions being in excess of the equivalent molecular proportion of said chlorate ions, maintaining the pH of said medium substantially within the range of 2–6.5 during the polymerization reaction, and recovering a homopolymer of said class from said medium.

2. The method of claim 1 in which the sources of chlorate ions and sulfite ions are alkali metal chlorates and alkali metal sulfites.

3. The method of claim 1 in which the molar ratio of chlorate ions to sulfite ions in said aqueous medium is substantially within the range of 1:3 to 1:6.

4. The method of claim 1 in which the sum of moles of sulfite ion and chlorate ion is substantially within the range of 0.1–2 mol percent of the material of said class.

5. The method of polymerizing monoethylenically-unsaturated, polymerizable, organic compounds of the class having a terminal ethylenic double bond, which includes the steps of adding a water-soluble chlorate salt which produces chlorate ions, and one part by weight of a material of said class to not more than four parts by weight of an aqueous acidic medium including a mixture of water and sulfite ions, said sulfite ions being in excess of the equivalent molecular proportion of said chlorate ions, maintaining the pH of said medium substantially within the range of 2–6.5 during the polymerization reaction, and recovering a homopolymer of said class from said medium.

6. The method of claim 5 in which the said chlorate salt and the source of said sulfite ions are alkali metal chlorates and alkali metal sulfites respectively.

7. The method of claim 5 in which the molar ratio of chlorate ions to sulfite ions in said aqueous medium is substantially within the range of 1:3 to 1:6.

8. The method of claim 5 in which the sum of the moles of sulfite ion and chlorate ion in said aqueous medium is substantially within the range of 0.1–2 mol percent of the material of said class.

9. The method of polymerizing compounds of the class having the generic formula $H_2C=CXY$, wherein X represents a member of the group consisting of H, $CH_3$—, and Cl, and Y represents a member of the group consisting of Cl,—CN, RCOO—, and —COOR', wherein R represents a saturated hydrocarbon radical having from 1–3 carbon atoms, and R' represents a saturated hydrocarbon radical having from 1–4 carbon atoms, which includes the steps of adding a water-soluble sulfite salt which produces sulfite ions, and one part by weight of a compound of said class, to not more than four parts by weight of an aqueous acidic medium including a mixture of water and chlorate ions, said sulfite ions being in excess of the equivalent molecular proportion of said chlorate ions, maintaining the pH of said medium substantially within the range of 2–6.5 during the polymerization reaction, and recovering a homopolymer of said class from said medium.

10. The method of claim 9 in which the molar ratio of chlorate ions to sulfite ions in said aqueous medium is substantially within the range of 1:3 to 1:6.

11. The method of claim 9 in which the source of said chlorate ions and said sulfite ions are alkali metal chlorates and alkali metal sulfites.

12. The method of claim 9 in which the sum of the moles of sulfite ion and chlorate ion in said aqueous medium is substantially within the range of 0.1–2 mol percent of the compound of said class.

13. The method of polymerizing compounds of the class having the generic formula $H_2C=CXY$, wherein X represents a member of the group consisting of H, $CH_3-$, and Cl, and Y represents a member of the group consisting of Cl, $-CN$, $RCOO-$, and $-COOR'$, wherein R represents a saturated hydrocarbon radical having from 1–3 carbon atoms, and R' represents a saturated hydrocarbon radical having from 1–4 carbon atoms, which includes the steps of dispersing a material of said class in an aqueous acidic medium including a mixture of water, an alkali metal chlorate, and an alkali metal sulfite, the molar ratio of chlorate ions and sulfite ions in said medium being substantially within the range of 1:3 to 1:6, the sum of moles of sulfite ions and chlorate ions being substantially within the range of 0.1–2 mol percent of the material of said class, and the weight ratio of said aqueous medium to said material of said class being within the ratio of 1:1 to 4:1, maintaining the pH of said medium substantially within the range of 2–6.5 during the polymerization reaction, and recovering a homopolymer of said class from said medium.

14. The method of claim 13 in which the material of said class is vinyl chloride.

15. The method of claim 13 in which the material of said class is vinylidene chloride.

16. The method of claim 13 in which the material of said class is vinyl cyanide.

17. The method of polymerizing compounds of the class having the generic formula $H_2C=CXY$, wherein X represents a member of the group consisting of H, $CH_3-$, and Cl, and Y represents a member of the group consisting of Cl, $-CN$, $RCOO-$, and $-COOR'$, wherein R represents a saturated hydrocarbon radical having from 1–3 carbon atoms, and R' represents a saturated hydrocarbon radical having from 1–4 carbon atoms, which includes the steps of dissolving a source of chlorate ions and a material of said class in an aqueous acidic medium including a mixture of water and a source of sulfite ions, said sources of chlorate ions and sulfite ions being selected from the class consisting of sodium and potassium chlorates and sulfites, the molar ratio of chlorate ions to sulfite ions in said medium being within the range of 1:3 to 1:6, the weight ratio of said aqueous medium to said material of said class being within the range of 1:1 to 4:1, and the sum of the moles of said chlorate ions and sulfite ions being substantially within the range of 0.1–2 mol percent of the material of said class, maintaining the temperature of said medium substantially within the range of 25°–80° C., maintaining the pH of said medium substantially within the range of 2–6.5 during the polymerization reaction, and recovering a homopolymer of said class from said medium.

18. The method of polymerizing a plurality of compounds of the class having the generic formula $H_2C=CXY$, wherein X represents a member of the group consisting of H, $CH_3-$, and Cl, and Y represents a member of the group consisting of Cl, $-CN$, $RCOO-$, and $-COOR'$, wherein R represents a saturated hydrocarbon radical having from 1–3 carbon atoms, and R' represents a saturated hydrocarbon radical having from 1–4 carbon atoms, which includes the steps of dispersing a material of said class in an aqueous acidic medium including a mixture of water, an alkali metal chlorate, and an alkali metal sulfite, the molar ratio of chlorate ion to sulfite ion in said medium being substantially within the range of 1:3 to 1:6, the sum of moles of said sulfite and said chlorate ions being substantially within the range of 0.1–2 mol percent of the materials of said class, and the weight ratio of said aqueous medium to said materials of said class being within the ratio of 1:1 to 4:1, maintaining the pH of said medium substantially within the range of 2–6.5 during the polymerization reaction, and recovering a copolymer of said class from said medium.

ARCHIE HILL.

References Cited in the file of this patent

UNITED STATES PATENTS

| Number | Name | Date |
|---|---|---|
| 2,299,223 | Frey | Oct. 20, 1942 |
| 2,531,403 | Crouch | Nov. 28, 1950 |
| 2,560,694 | Howard | July 17, 1951 |